United States Patent
Chowdhury et al.

(10) Patent No.: US 12,249,948 B2
(45) Date of Patent: Mar. 11, 2025

(54) SPLIT-PHASE PROTECTION OF GENERATORS

(71) Applicant: Schweitzer Engineering Laboratories, Inc., Pullman, WA (US)

(72) Inventors: Ritwik Chowdhury, Charlotte, NC (US); Matchyaraju Alla, Pullman, WA (US); Normann Fischer, Colfax, WA (US); Dale S. Finney, Little Bras d'Or (CA)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 276 days.

(21) Appl. No.: 17/823,344

(22) Filed: Aug. 30, 2022

(65) Prior Publication Data

US 2024/0072697 A1 Feb. 29, 2024

(51) Int. Cl.
*H02P 9/00* (2006.01)
*H02P 103/20* (2016.01)

(52) U.S. Cl.
CPC .......... *H02P 9/006* (2013.01); *H02P 2103/20* (2015.01); *H02P 2205/01* (2013.01)

(58) Field of Classification Search
CPC .............................. H02P 9/006; H02P 2205/01
See application file for complete search history.

(56) References Cited

U.S. PATENT DOCUMENTS

| | | |
|---|---|---|
| 2,881,319 A | 4/1959 | Sills |
| 3,727,123 A | 4/1973 | Smith |
| 3,973,171 A | 8/1976 | Howell |
| 4,000,464 A | 12/1976 | Nussel |
| 4,001,646 A | 1/1977 | Howell |
| 4,029,951 A | 6/1977 | Berry |
| 4,066,950 A | 1/1978 | Rumold |
| 4,088,935 A | 5/1978 | D'Atre |
| 4,148,087 A | 4/1979 | Phadke |

(Continued)

FOREIGN PATENT DOCUMENTS

| | | |
|---|---|---|
| CN | 203324449 | 12/2013 |
| WO | 239642 | 5/2002 |
| WO | 2014067742 | 5/2014 |

OTHER PUBLICATIONS

H. R. Sills and J. L. McKeever., "Characteristics of Split-Phase Currents as a Source of Generator Protection," Transactions of the American Institute of Electrical Engineers, Part III: Power Apparatus and Systems, vol. 72, Issue 2, Jan. 1953, pp. 1005-1016.

(Continued)

*Primary Examiner* — Tulsidas C Patel
*Assistant Examiner* — Thomas K Quigley
(74) *Attorney, Agent, or Firm* — Jared L. Cherry (57) ABSTRACT

The present disclosure pertains to devices, systems, and methods for monitoring a generator. In one embodiment, the system may include a measurement subsystem to receive a plurality of split-phase measurements of branch currents associated with the at least one generator. A split-phase transverse differential monitoring subsystem may receive the plurality of split-phase measurements of branch currents associated with the at least one generator and may generate an offset value representing a standing split-phase current. A protective action subsystem may generate a first protective action based on the phasor operating current.

18 Claims, 12 Drawing Sheets

(56) References Cited

U.S. PATENT DOCUMENTS

| | | |
|---|---|---|
| 4,156,186 A | 5/1979 | Wolfinger |
| 4,159,499 A | 6/1979 | Breskin |
| 4,161,011 A | 7/1979 | Wilkinson |
| 4,206,398 A | 6/1980 | Janning |
| 4,245,182 A | 1/1981 | Aotsu |
| 4,321,643 A | 3/1982 | Vernier |
| 4,371,832 A | 2/1983 | Wilson |
| 4,511,811 A | 4/1985 | Gupta |
| 4,542,468 A | 9/1985 | Taniguti |
| 4,556,946 A | 12/1985 | Taniguti |
| 4,558,309 A | 12/1985 | Antonevich |
| 4,667,263 A | 5/1987 | Morris |
| 4,763,057 A | 8/1988 | Danz |
| 4,820,991 A | 4/1989 | Clark |
| 4,825,327 A | 4/1989 | Alexander |
| 4,851,758 A | 7/1989 | Ostada |
| 4,939,506 A | 7/1990 | Gram |
| 4,982,147 A | 1/1991 | Lauw |
| 5,057,962 A | 10/1991 | Alley |
| 5,252,915 A | 10/1993 | Sedding |
| 5,264,778 A | 11/1993 | Kimmel |
| 5,363,047 A | 11/1994 | Dresti |
| 5,508,620 A | 4/1996 | Pfiffner |
| 5,514,963 A | 5/1996 | Korbmacher |
| 5,519,300 A | 5/1996 | Leon |
| 5,581,470 A | 12/1996 | Pawloski |
| 5,592,393 A | 1/1997 | Yalla |
| 5,633,550 A | 5/1997 | Meehan |
| 5,675,465 A | 10/1997 | Tanaka |
| 5,739,693 A | 4/1998 | Pfiffner |
| 5,764,462 A | 6/1998 | Tanaka |
| 5,805,394 A | 9/1998 | Glennon |
| 5,805,395 A | 9/1998 | Hu |
| 5,933,306 A | 8/1999 | Santos |
| 5,982,595 A | 11/1999 | Pozzuoli |
| 6,121,886 A | 9/2000 | Anderson |
| 6,137,187 A | 10/2000 | Mikhail |
| 6,169,489 B1 | 1/2001 | Kliman |
| 6,262,550 B1 | 7/2001 | Kliman |
| 6,294,898 B2 | 9/2001 | Lawson |
| 6,341,055 B1 | 1/2002 | Guzman-Casillas |
| 6,356,421 B1 | 3/2002 | Guzman-Casillas |
| 6,396,284 B1 | 5/2002 | Tisdale |
| 6,426,632 B1 | 7/2002 | Clunn |
| 6,459,269 B1 | 10/2002 | Jones |
| 6,492,801 B1 | 12/2002 | Sims |
| 6,518,767 B1 | 2/2003 | Roberts |
| 6,525,504 B1 | 2/2003 | Nygren |
| 6,590,397 B2 | 7/2003 | Roberts |
| 6,714,020 B2 | 3/2004 | Hobelsberger |
| 6,794,879 B2 | 9/2004 | Lawson |
| 6,794,883 B2 | 9/2004 | Klingel |
| 6,815,932 B2 | 11/2004 | Wall |
| 6,839,207 B2 | 1/2005 | Falliot |
| 6,924,565 B2 | 8/2005 | Wilkins |
| 6,924,628 B2 | 8/2005 | Thompson |
| 6,975,946 B2 | 12/2005 | Al-Hamrani |
| 6,992,490 B2 | 1/2006 | Nomoto |
| 7,006,935 B2 | 2/2006 | Seki |
| 7,196,884 B2 | 3/2007 | Guzman-Casillas |
| 7,253,634 B1 | 8/2007 | Kasztenny |
| 7,304,403 B2 | 12/2007 | Xu |
| 7,319,576 B2 | 1/2008 | Thompson |
| 7,345,863 B2 | 3/2008 | Fischer |
| 7,375,941 B2 | 5/2008 | Schweitzer |
| 7,425,778 B2 | 9/2008 | Labuschagne |
| 7,498,818 B2 | 3/2009 | Benmouyal |
| 7,528,611 B2 | 5/2009 | Kasztenny |
| 7,532,010 B2 | 5/2009 | Kamel |
| 7,592,772 B2 | 9/2009 | Nandi |
| 7,660,088 B2 | 2/2010 | Mooney |
| 7,710,693 B2 | 5/2010 | Guzman-Casillas |
| 7,804,303 B2 | 9/2010 | Benmouyal |
| 7,903,381 B2 | 3/2011 | Fischer |
| 8,154,836 B2 | 4/2012 | Kasztenny |
| 8,289,668 B2 | 10/2012 | Kasztenny |
| 8,405,940 B2 | 3/2013 | Schweitzer, III |
| 8,405,944 B2 | 3/2013 | Donolo |
| 8,553,379 B2 | 10/2013 | Kasztenny |
| 8,559,146 B2 | 10/2013 | Kasztenny |
| 8,649,142 B2 | 2/2014 | Kasztenny |
| 8,675,327 B2 | 3/2014 | Kasztenny |
| 8,792,217 B2 | 7/2014 | Shah |
| 9,660,438 B2 | 5/2017 | Donolo |
| 10,288,688 B2 | 5/2019 | Kasztenny |
| 2001/0001534 A1 | 5/2001 | Lawson |
| 2002/0128759 A1 | 9/2002 | Sodoski |
| 2002/0140433 A1 | 10/2002 | Lawson |
| 2005/0033481 A1 | 2/2005 | Budhraja |
| 2006/0125486 A1 | 6/2006 | Premerlani |
| 2007/0070565 A1 | 3/2007 | Benmouyal |
| 2007/0085549 A1 | 4/2007 | Fischer |
| 2008/0042683 A1 | 2/2008 | Kasztenny |
| 2008/0074810 A1 | 3/2008 | Guzman-Casillas |
| 2009/0039655 A1 | 2/2009 | Berchowitz |
| 2009/0160454 A1 | 6/2009 | Johansson |
| 2009/0219030 A1 | 9/2009 | Salem |
| 2009/0228224 A1 | 9/2009 | Spanier |
| 2009/0254297 A1 | 10/2009 | Bengtsson |
| 2010/0194324 A1 | 8/2010 | Kasztenny |
| 2011/0264389 A1 | 10/2011 | Mynam |
| 2012/0112758 A1 | 5/2012 | Weems |
| 2012/0140365 A1 | 6/2012 | Labuschagne |
| 2014/0002937 A1 | 1/2014 | Tausa |
| 2014/0100702 A1 | 4/2014 | Schweitzer |
| 2014/0117912 A1 | 5/2014 | Gajic |

OTHER PUBLICATIONS

S. Kim, D. Finney, N. Fischer, and B. Kasztenny, "CT Requirements for Generator Split-Phase Protection," proceedings of the 38th Annual Western Protective Relay Conference, Spokane, WA, Oct. 2011.

C. Howard, B. Andrews, D. Taylor, N. Fischer and M. Alla, "Lessons Learned from Generator Destructive Testing," WPRC 2019.

R. Chowdhury, D. Finney and N. Fischer, "Using the Multi-loop Fault Analysis Method for Setting and Evaluating Generator Protection Elements," WPRC 2017.

Donolo, Marcos; Guzman, Armando; Mynam, Mangapathirao; Jain, Rishabh; Finney, Dale; Generator Protection Overcomes Current Transformer Limitations; Oct. 14, 2014.

Schweitzer Engineering Laboratories, Inc., SEL-300G Multifunction Generator Relay, Instruction Manual (excerpts) Oct. 17, 2014.

Thompson, Michael J.; Percentage Restrained Differential, Percentage of What?; Sep. 14, 2010.

Altuve, Hector; Schweitzer III, Edmund; Modern Solutions for Protection, Control, and Monitoring of Electric Power Systems (sections of); Jun. 10, 2010.

SPLIT-PHASE PROTECTION OF GENERATORS

TECHNICAL FIELD

This disclosure relates to systems and methods to protect synchronous generators in electric power systems. More particularly, but not exclusively, this disclosure relates to systems to monitor and protect synchronous generators that have parallel-branch stator windings using a split-phase element.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power systems are used to generate, transmit, and distribute electric power to loads, and serve as an important part of critical infrastructure. In some cases, electric power systems and equipment may be monitored and protected by a variety of types of equipment. Such equipment may include sensors to monitor currents, voltages, phases, and other parameters of the electric power system. Relays may analyze the parameters of the electric power system to implement protective functions. Specific protection systems may be implemented for generators in an electric power system.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Figure 1A:
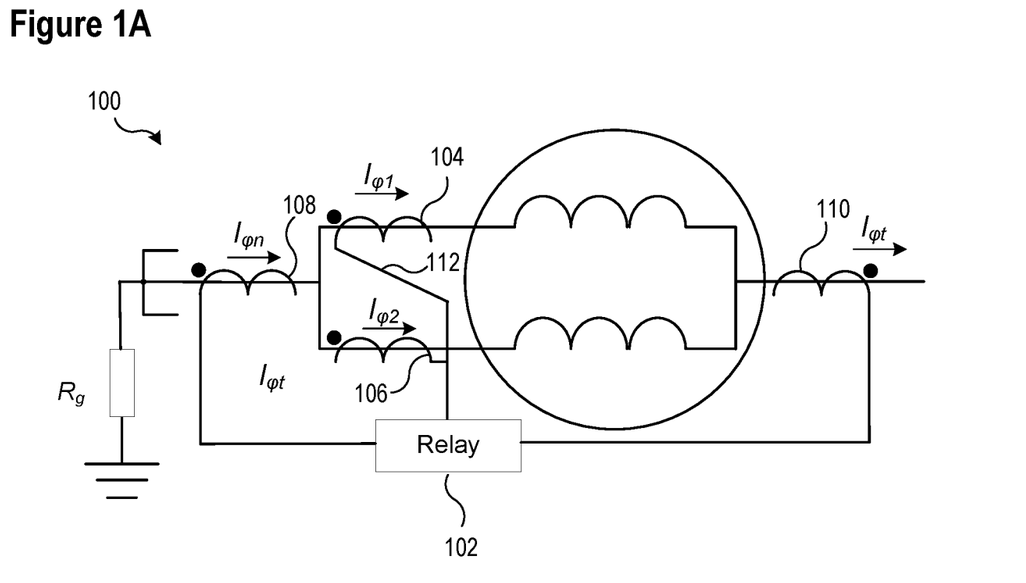
FIG. 1A illustrates a single line diagram of a synchronous generator system with two branch currents monitored by a relay, consistent with embodiments of the present disclosure.

FIG. 1A illustrates a single line diagram of a synchronous generator system 100 with two branch currents monitored by a relay 102 consistent with embodiments of the present disclosure. In one specific embodiment, relay 102 may be embodied as generator protection relay, such as SEL-400G, available from Schweitzer Engineering Laboratories, Inc. of Pullman Washington. A first current, $I_{\varphi 1}$, may flow through a first branch and be monitored by a first current transformer 104. A second current, $I_{\varphi 2}$, may flow through a second branch and be monitored by a second current transformer 106. First current transformer 104 and second current transformer 106 are electrically coupled together by line 112. This configuration effectively subtracts one branch current from the other, and typically results in a value near zero. As such, an overcurrent element may be used to monitor a difference between $I_{\varphi 1}$ and $I_{\varphi 2}$. When the difference between the branch currents exceeds a threshold, a protective action may be implemented.

Currents into and out of the branches may also be monitored by relay 102. A current $I_{\varphi n}$ may be monitored by a third current transformer 108 that is associated with the generator phase currents as measured at the neutral, which is the sum of the first current, $I_{\varphi 1}$, and the second current $I_{\varphi 2}$. A fourth current transformer 110 may monitor the generator phase currents at the terminals, $I_{\varphi t}$, which is also the sum of the branch currents. An equivalent impedance value, $R_g$, may represent the grounding impedance of the generator. Based on the measurements of the currents, relay 102 may control and protect synchronous generator system 100.

Figure 1B:
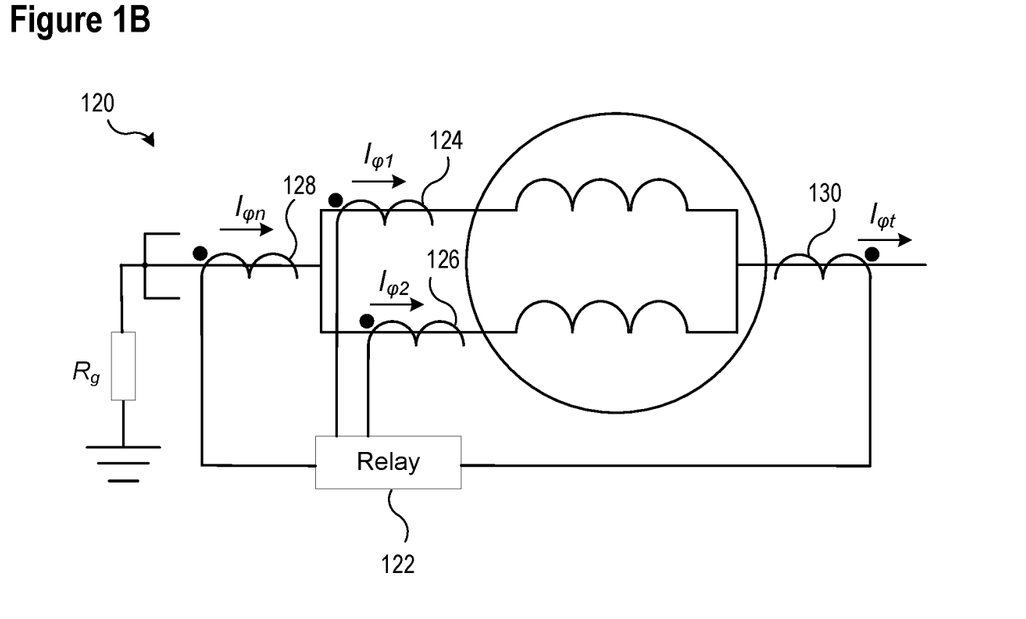
FIG. 1B illustrates a line diagram of a synchronous generator system with a split-phase element comprising a first current transformer and a second current transformer consistent with embodiments of the present disclosure.

FIG. 1B illustrates a line diagram of a synchronous generator system 120 with a split-phase element comprising a first current transformer 124 and a second current transformer 126 consistent with embodiments of the present disclosure. A third current transformer 128 may monitor the generator neutral current $I_{\varphi n}$, and a fourth current transformer 130 may monitor the generator terminal current $I_{\varphi t}$. Each of first current transformer 124 and second current transformer 126 provide inputs to relay 122. Relay 122 may use these inputs to provide improved protection to synchronous generator system 120. For example, relay 122 may implement an algorithm that subtracts $I_{\varphi 1}$ from $I_{\varphi 2}$, and may monitor the result for a value that exceeds a threshold. Additionally, it may sum $I_{\varphi 1}$ from $I_{\varphi 2}$ to obtain a value that can serve as a reference for the difference current between $I_{\varphi 1}$ and $I_{\varphi 2}$. Other types of monitoring schemes may also be utilized.

System 120 may provide improved security and sensitivity for inter-turn fault detection in comparison to synchronous generator system 100. In various embodiments consistent with the present disclosure, relay 122 may utilize a split-phase transverse differential element to monitor and protect synchronous generator system 120. A split-phase transverse differential element may offer greater security, speed, and sensitivity for stator inter-turn fault detection function.

Challenges in detecting stator inter-turn faults may be generally categorized as either a steady state error or a transient error. Steady state errors are present while the system is in a steady state condition and may be represented as a steady state error scalar, $I_{OFF\varphi}$. There is generally a standing circulating current between each branch of a synchronous generator system during steady state operation. The variation in this standing circulating current depends on the season (temperature/humidity), load, manufacturing tolerances, and other factors. Transient errors may exist due to an external fault due to the differences between the branches (primary phenomenon) along with measurement errors due to unequal performance of the current transformers (secondary phenomenon).

Providing separate branch currents, as is shown in synchronous generator system 120 provides additional information that synchronous generator system 120 may use to improve protection. Such systems and methods may provide reduced response times by incorporating a combination of protective elements. For example, security, sensitivity, and speed can be balanced in various embodiments by using a combination of protection elements. In some embodiments, a 32QR and a 50SP element may be used in combination to potentially increase the speed, sensitivity, and security of a generator protection system. Still further, some embodiments may use a 32QR and a 50F2 element in combination.

Figure 1C:
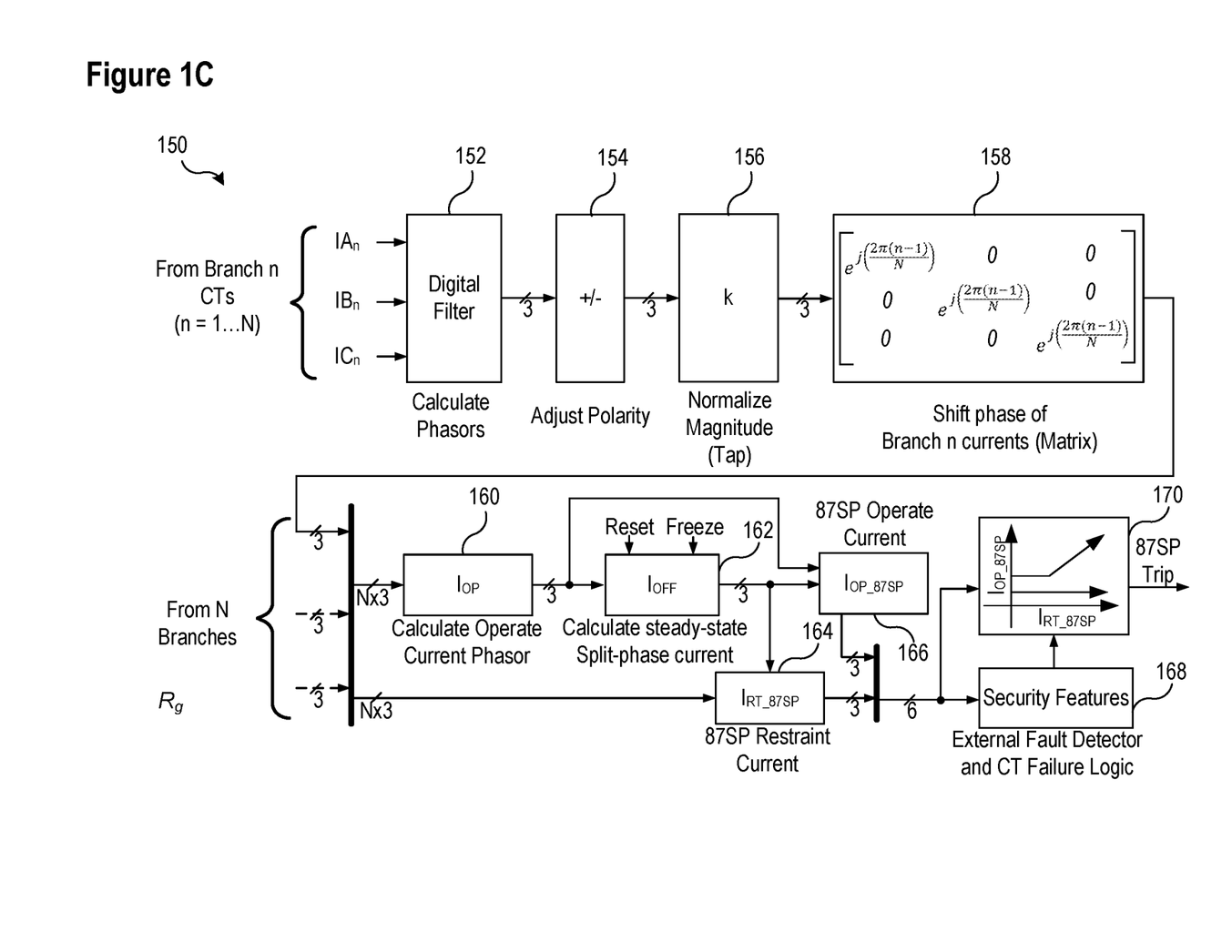
FIG. 1C illustrates a block diagram of a split-phase protection system consistent with the present disclosure.

FIG. 1C illustrates a block diagram of a split-phase protection system 150 consistent with the present disclosure. Currents from a three-phase system are received by a digital filter and phasors are calculated by block 152. Block 154 may adjust a polarity of the phasors, and block 156 may normalize a magnitude of the phasors. Block 158 represents a matrix that shifts the phase of each branch current by multiplying the currents with a complex exponential value.

Block 160 may calculate an operate current phasor. Block 162 may calculate a steady state split-phase current. Freeze and reset signals may be provided to block 162. The output of block 162 may be an input to block 164, which calculates a restraint current, and to block 166 which calculates an operate current. The output of blocks 164 and 166 may be provided as inputs to blocks 168 and 170. Block 168 may implement security features, such as an external fault detector and CT failure logic. An output of block 168 may be provided to modify the operating characteristics of block 170, which generates a trip signal based on the operating current and the restraint current.

Figure 2A:
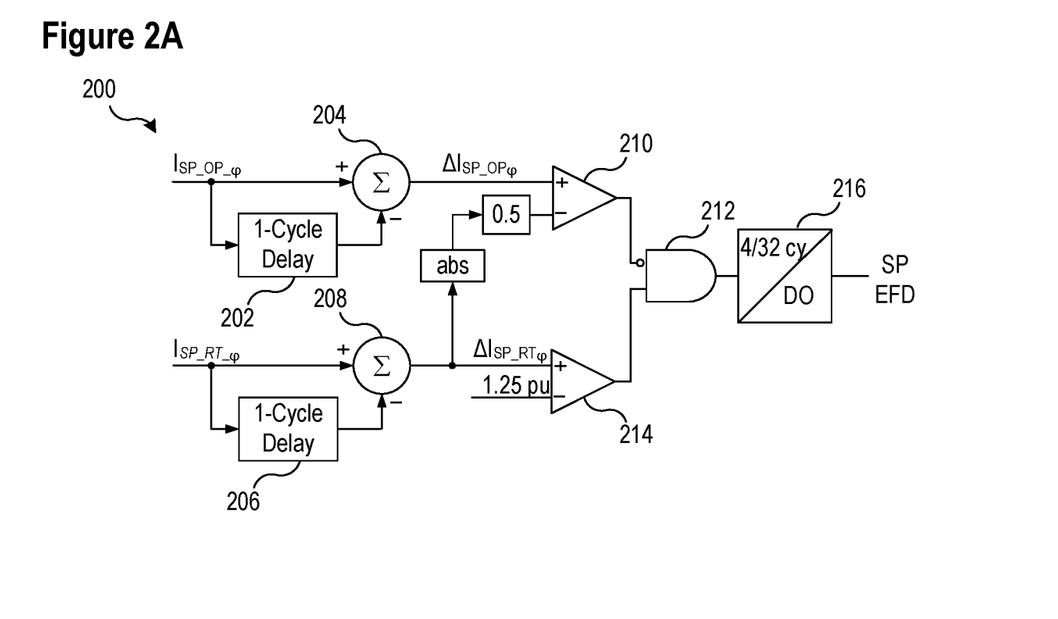
FIG. 2A illustrates a logic diagram of one embodiment of a split-phase external fault detector (SP EFD) consistent with embodiments of the present disclosure.

FIG. 2A illustrates a logic diagram of one embodiment of a split-phase external fault detector (SP EFD) 200 consistent with embodiments of the present disclosure. SP EFD 200 receives the phasor operating current ($I_{SP\_OP\_\varphi}$) for the phase φ (A, B or C) of the split-phase element, and receives the inter-turn fault the restraint ($I_{SP\_RT\_\varphi}$) The phasor operating current ($I_{SP\_OP\_\varphi}$) for the Phase φ (A, B or C)

split-phase element is calculated using Eq. 1 and Eq. 2. A first buffer 202 generates a 1-cycle delay in the value of $I_{SP\_OP\_\varphi}$. A summer 204 determines a difference between the present value and the prior value of $I_{SP\_OP\_\varphi}$.

$$I_{SP\_\varphi\_F} = I_{\varphi 1F} + I_{\varphi 2F} \cdot e^{j\left(\frac{2\pi(n-1)}{N}\right)} \qquad \text{Eq. 1}$$

Where $I_{SP\_\varphi\_F}$ is the split-phase current between the branch currents; $I_{OFF\varphi}$ is the standing phasor value of the split-phase current that is determined such that $I_{SP\_OP\_\varphi}$ is zero during normal conditions;
N is the number of branches.
n is the branch number ranging from 1 to N
$I_{\varphi 1F}$ and $\varphi_{\varphi 2F}$ are the fundamental currents through branches 1 and 2, respectively.

For N=2, the exponential term equals −1. Other values may be determined based on the value of N. For example, for N=3, the exponential term is −0.5+0.866j for $I_{\varphi 2F}$ and −0.5−0.866j for $I_{\varphi 3F}$. In other embodiments, such as when N=4, the value of the exponential term is j for $I_{\varphi 1F}$, −1, and −j for $I_{\varphi 2F}$, $I_{\varphi 3F}$, and $I_{\varphi 4F}$ respectively. In some embodiments, a compensation matrix (e.g., a current transformer compensation matrix (CTC) available in some relays) may be utilized; however, use of a standing error scalar value (Eq. 1) and a phasor calculated using a complex exponential function based on a measurement of fundamental currents through the branches (Eq. 2) may provide additional sensitivity and security.

A second buffer 206 generates a 1-cycle delay in the value of split-phase restraint current, $I_{SP\_RT\_\varphi}$. $I_{SP\_RT\_\varphi}$ may be calculated using Eq. 2. A summer 208 determines a difference between the present value and the prior value of $I_{SP\_RT\_\varphi}$.

$$I_{SP\_RT\_\varphi} = \text{abS}(I_{\varphi 1F}) + \text{abs}(I_{\varphi 2F}) + \text{abs}(I_{OFF\varphi}) \qquad \text{Eq. 2}$$

A first comparator 210 compares the output of summer 204 to the absolute value of the output of summer 208. In the illustrated embodiment, the absolute value of the output of summer 208 is reduced by half. In other embodiments, a different value may be used. The absolute value is the phasor magnitude. An inverted output of comparator 210 is provided to an AND gate 212. The other input of AND gate 212 is generated by a second comparator 214. The difference between the present value and the prior value of $I_{SP\_RT\_\varphi}$, $\Delta I_{RT}$, is compared to a threshold value. In the illustrated embodiment, the value is 1.25, but a different threshold value may be selected in other embodiments. The value may be selected to correspond to an increase over the rated current for a protected system in certain embodiments. An output of AND gate 212 is provided to a counter 216. In the illustrated embodiment, if the output of AND gate 212 is asserted for 4 of 32 samples as measured within one cycle, an SP EFD output is asserted.

Figure 2B:
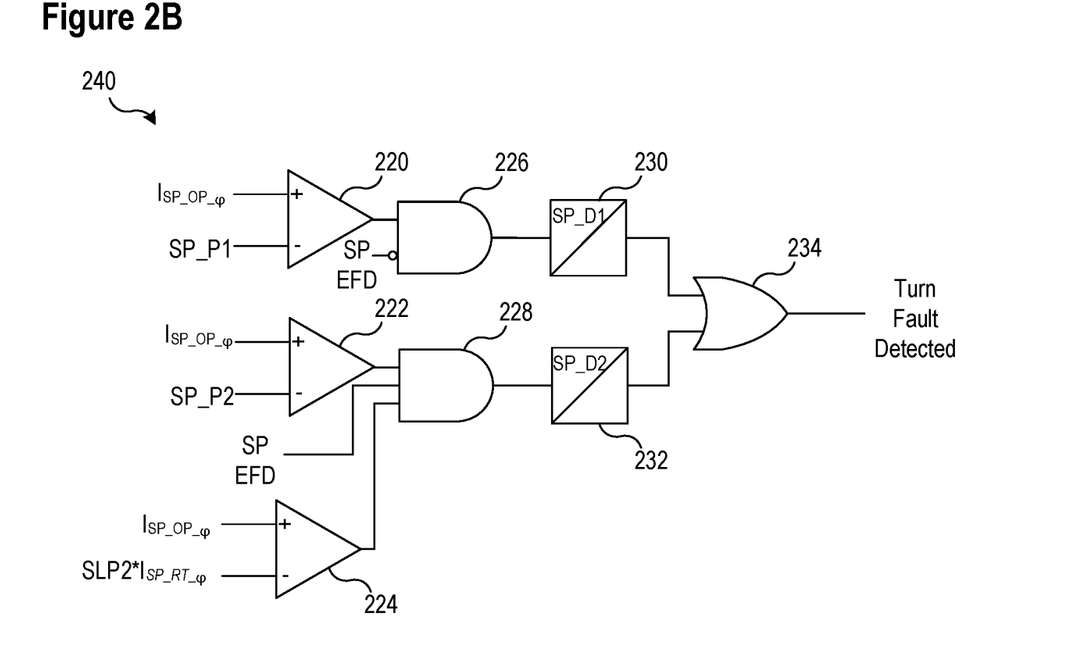
FIG. 2B illustrates a logic diagram of one embodiment of a system to detect a turn fault in two branches of a generating unit consistent with embodiments of the present disclosure.

FIG. 2B illustrates a logic diagram of one embodiment of a system 240 to detect a turn fault in one of two branches of a generating unit consistent with embodiments of the present disclosure. A third comparator 220 may compare $I_{SP\_OP\_\varphi}$ to a first split-phase pickup value, SP_P1. A fourth comparator 222 may compare $I_{SP\_OP\_\varphi}$ to a second split-phase pickup value, SP_P2. SP_P1 and SP_P2 may be constant thresholds selected based on the parameters of a system. In one specific embodiment, SP_P1 may be approximately 100 mA, and SP_P2 may be approximately 500 mA. Other values for SP_P1 and SP_P2 may be used depending on the application.

A fifth comparator 224 may compare $I_{SP\_OP\_\varphi}$ to a percentage, SLP2, of $I_{SP\_RT\_\varphi}$. The percentage value, SLP2, may be based on a system parameter (e.g., the CT size as a function of the external fault current levels). The outputs of comparators 220, 222, and 224 may be inputs to AND gates 226 and 228. AND Gate 226 also receives SP EFD as an input, while AND gate 228 receives the SP EFD for FIG. 2A, and the output of comparator 224 as an input. An output of AND gate 226 is an input to a counter 230, and an output of AND gate 228 is an input to counter 232. Counters 230 and 232 may assert after a respective input is asserted for a certain number of cycles. An OR gate 234 may assert if counter 230 or counter 232 are asserted. Assertion of OR gate 234 corresponds to a turn fault detected.

Figure 2C:
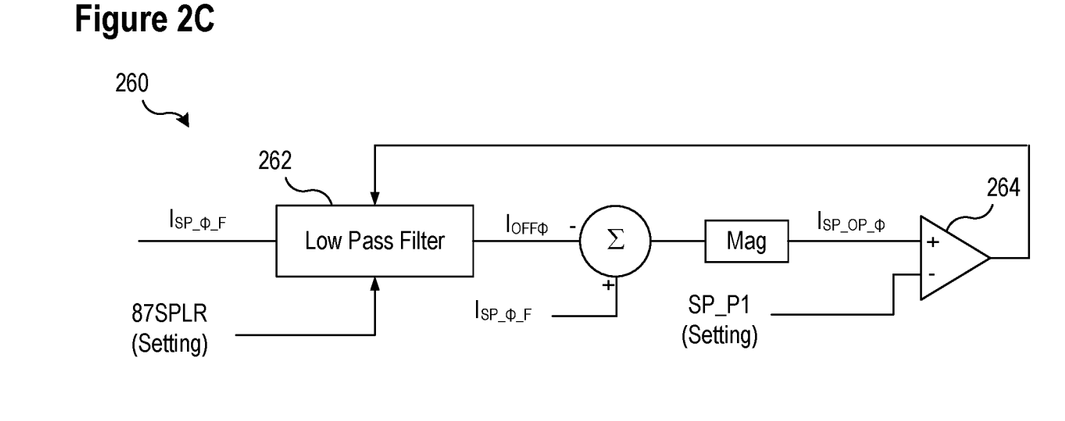
FIG. 2C illustrates a logic diagram of one embodiment of a system to determine an offset value consistent with embodiments of the present disclosure.

FIG. 2C illustrates a logic diagram of one embodiment of a system 260 to determine an offset value, $I_{OFF\varphi}$, consistent with embodiments of the present disclosure. A low pass filter (LPF) 262 has an output $I_{Off\varphi}$. The value of $I_{Off\varphi}$ follows the input $I_{SP\_\varphi\_F}$ with a time-constant. In one specific embodiment, LPF 262 may be implemented as an infinite impulse response filter with a time-constant of 1 second. In some embodiments, the time-constant of the low-pass filter can be configured by the user.

LPF 262 may also receive have two input controls. First, the value 87SPLR is a setting that corresponds to a user programmable reset input. This setting allows the user to force $I_{Off\varphi}$ equal to $I_{SP\_\varphi\_F}$. Second, the output of a comparator 264 may act as an input to freeze the output of LPF 262 when $I_{SP\_OP\_\varphi}$ is greater than SP_P1, which is also an input in system 240, illustrated in FIG. 2B. When this condition occurs, the value of $I_{Off\varphi}$ may be set to the previous value of $I_{Off\varphi}$, and any variation in $I_{SP\_\varphi\_F}$ may be ignored. An assertion of 87SPLR takes precedence and may force $I_{Off\varphi}$ equal to $I_{SP\_\varphi\_F}$.

Figure 3:
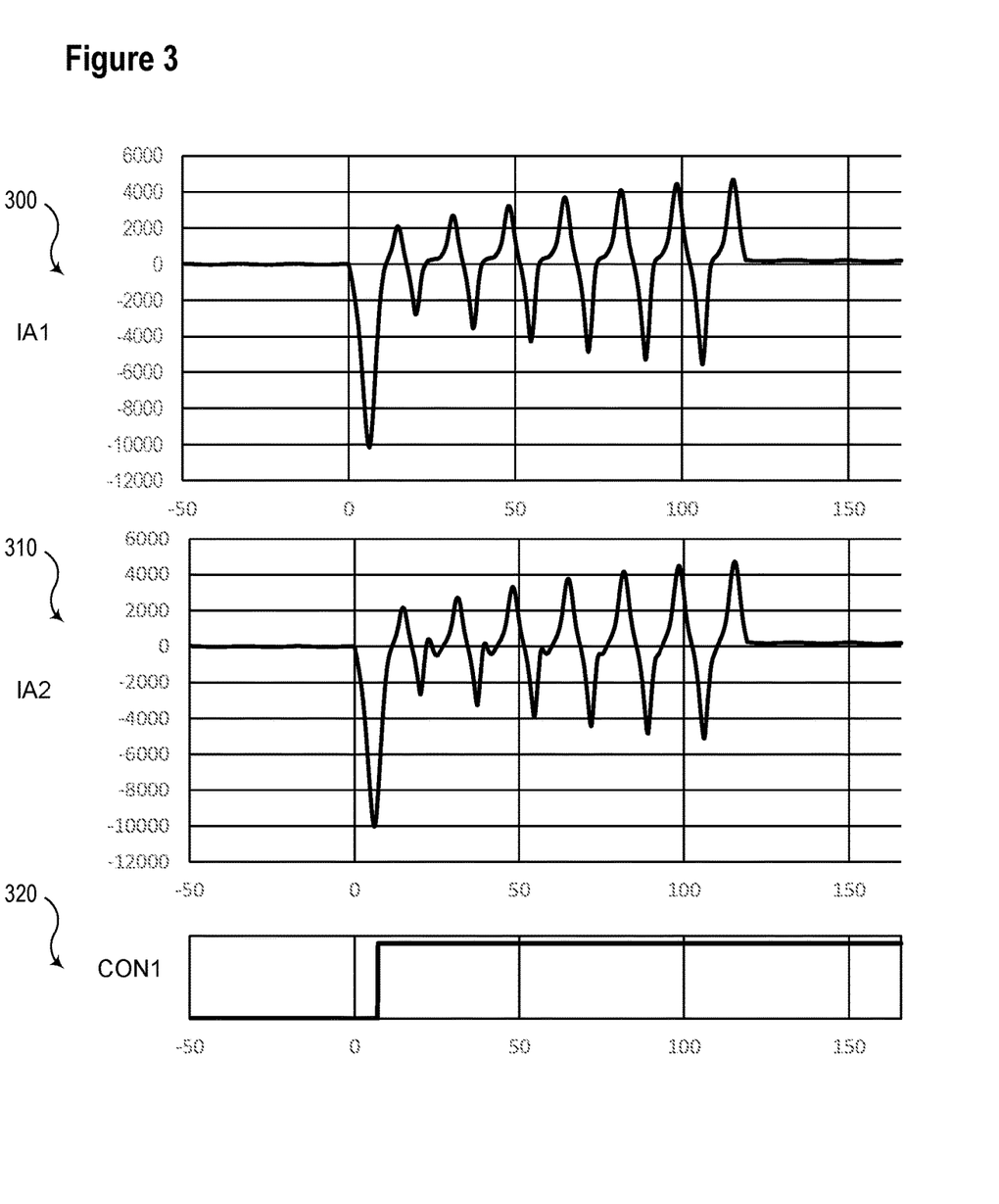
FIG. 3 illustrates a plurality of plots over time of showing an external fault consistent with embodiments of the present disclosure.

FIG. 3 illustrates a plurality of plots over time of showing an external fault consistent with embodiments of the present disclosure. A performance is shown via field events obtained from staged fault testing on an 8.89MVA 4 kV generator (~1300 A rated current). Plot 300 illustrates a value measured by an IA1 measurement, which is the Branch 1 current of the A phase. Plot 310 illustrates a current through a second branch, IA2, of a synchronous generator system. Plot 320 illustrates an output of a control signal, CON1, that may be associated with a protective action. A staged fault at 0 milliseconds induces a large current. The current is detected and the CON1 signal is asserted shortly thereafter to prevent tripping of the split-phase element. The fault was cleared approximately 120 milliseconds after the it began. In some systems, a protective action associated with CON1 assertion may be an increase in the slope required to trip or may be associated with an increased pickup time delay for additional security.

Figure 4A:
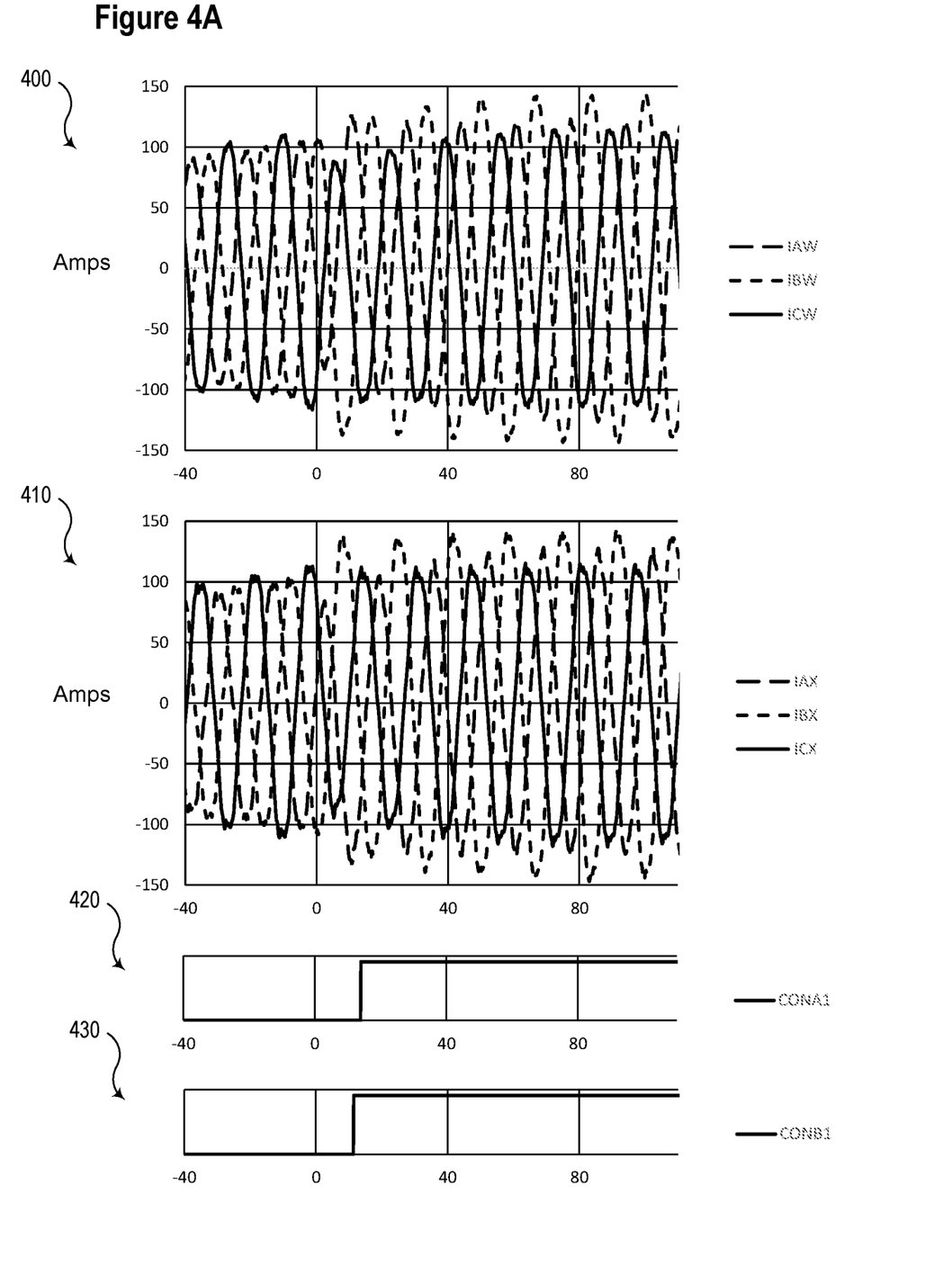
FIG. 4A illustrates plots over time of a system in response to an internal fault consistent with embodiments of the present disclosure.

FIG. 4A illustrates plots over time of a system in response to an internal fault consistent with embodiments of the present disclosure. An internal fault occurs at about 0 ms, as shown in plots 400 and 410. An external fault detector associated with the generator phase differential by using $I_{\varphi n}$ and $I_{\varphi r}$ identifies an external fault associated with the A and B phases, as indicated by the assertion of the CONA1 signal in plot 420 and the CONB1 in plot 430. More preferably, the system would identify an internal fault and not an external fault. If a CONA1 indication were to be used to secure an element that detects turn faults, it may reduce dependability of such an element.

Figure 4B:
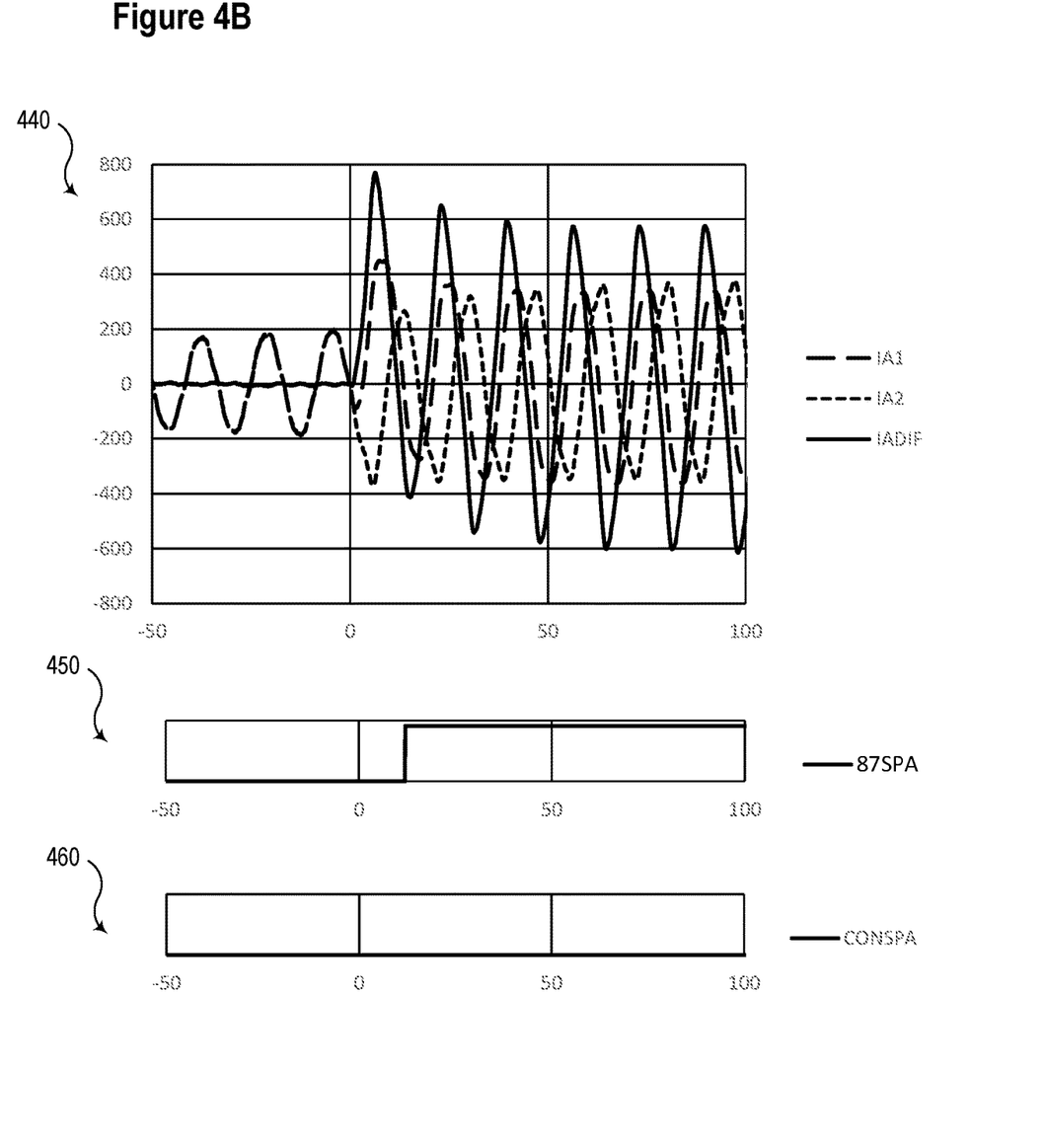
FIG. 4B illustrates a plot over time of the fault triggered in FIG. 4A consistent with embodiments of the present disclosure.

FIG. 4B illustrates plots over time of the fault triggered in FIG. 4A consistent with embodiments of the present disclosure. At fault inception, the two branch currents (IA1 and IA2) diverge, as shown by the difference of the two currents (IADIF) in plot 440. An appropriate threshold may be set to detect the fault. For this fault, IDIF is approximately 574 A peak, or 5.1 A secondary rms (574/sqrt(2)/(400/5)). The 87SPA element detects the fault, as shown by the signal illustrated in plot 450, while the signal CONSPA illustrated in plot 460, which is associated with an external fault detector, remains unasserted. The performance in FIG. 4B by using the branch currents results in proper protective action, a trip and no assertion of an external fault indication unlike the case of FIG. 4A where the generator phase currents were used.

Figure 5A:
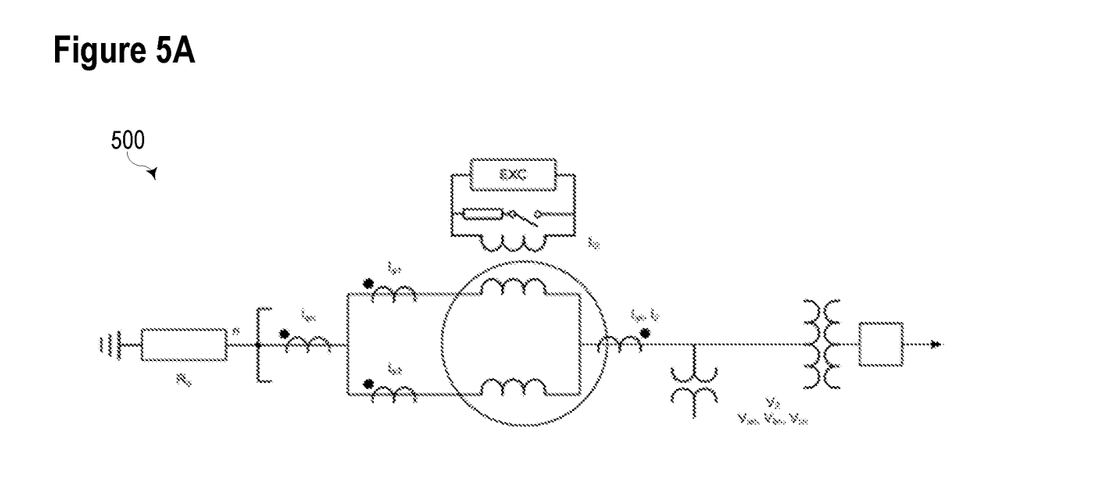
FIG. 5A illustrates a line diagram of a system including a generator and showing signals that may be available and used to provide stator inter-turn fault protection consistent with embodiments of the present disclosure.

FIG. 5A illustrates a line diagram of a system 500 including a generator and showing signals that may be available and used to provide stator inter-turn fault protection consistent with embodiments of the present disclosure. The availability of multiple signals to detect inter-turn fault conditions may provide additional confidence in implementing a protective action.

As discussed above, a split-phase transverse differential (87SP) element may use the signals $I_{\phi 1}$ and $I_{\phi 2}$ to detect an inter-turn fault. Where these signals are provided separately to a generator protection relay, additional information is available. A split-phase overcurrent (50SP/51SP), which is an external summation of the branch currents $I_{\phi 1}$ and $I_{\phi 2}$, provides less information, and is therefore less sensitive and slower to operate than an 87SP element to ensure adequate security. Despite these issues, inter-turn faults may be detected using 50SP/51SP elements.

Voltage signals may also be used to detect inter-turn faults. For example, an unbalance zero-sequence overvoltage (59GN) element may use the sum of $V_{an}$, $V_{bn}$, and $V_{cn}$ to determine a zero-sequence voltage of the stator winding. A zero-sequence over-voltage indicates an internal asymmetric fault in the stator winding. A negative-sequence directional (32Q) element may utilize $V_2$ and $I_2$ to detect inter-turn faults. Finally, a field second harmonic overcurrent (50F2) element may use the field current as measured by a transducer such as a hall-effect sensor. Where multiple signals indicate a turn-fault condition, or indicate an absence of an external condition, time delays normally used to increase security may be accelerated in various embodiments consistent with the present disclosure.

Figure 5B:
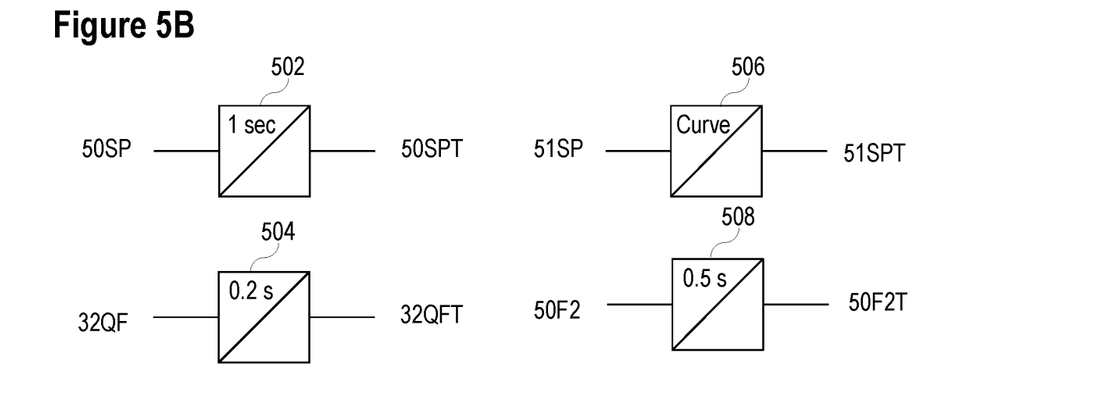
FIG. 5B illustrates a plurality of delays associated with various protection elements consistent with embodiments of the present disclosure.

FIG. 5B illustrates a plurality of delays associated with various protection elements consistent with embodiments of the present disclosure. Element 502 reflects a 1-second time delay between the assertion of a 50SP element and the assertion of a corresponding trip signal, 50SPT. Other elements have different time delays. Element 504 shows a 0.2 s delay between the assertion of a 32QF element and a corresponding trip signal, 32QFT, and element 508 shows a 0.5 s delay between the assertion of a 50F2 element and a corresponding trip signal, 50F2T. Element 506 shows a delay based on a curve associated between the assertion of a 51SP element and the assertion of a corresponding trip signal, 51SPT. A curve may be defined by a pickup, time-dial, and a curve characteristic. In one embodiment, the time dial may be reduced (e.g., if the initial time dial is 2, it may be reduced to 0.5).

Figure 5C:
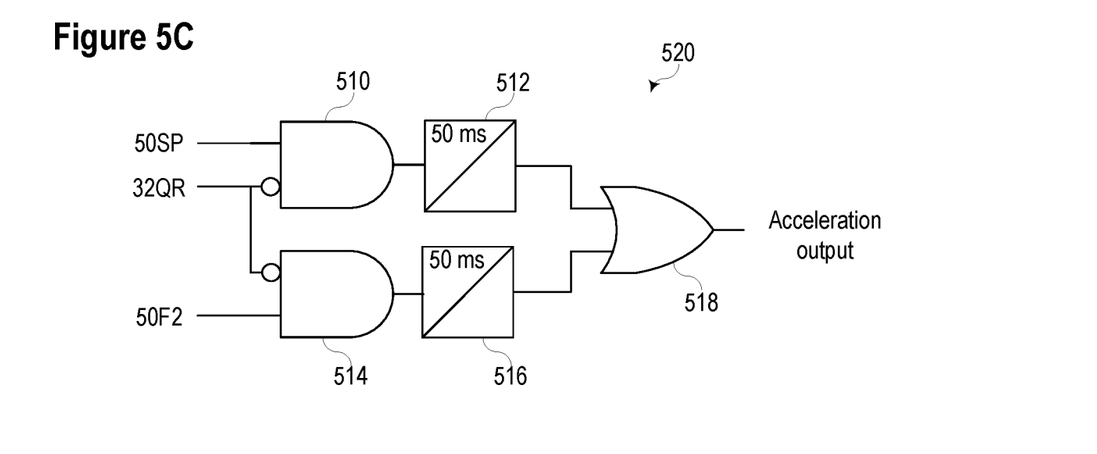
FIG. 5C illustrates a logic diagram of a system to accelerate protection elements consistent with embodiments of the present disclosure.

FIG. 5C illustrates a logic diagram of a system 520 to accelerate protection elements consistent with embodiments of the present disclosure. In the illustrated embodiment, combinations of 32QR, 50SP, and 50F2 elements may be used to accelerate the assertion of a corresponding trip signal. The inverse of 32QR and 50SP are inputs to AND gate 510. As illustrated in FIG. 5B, a delay associated with 50SP is 1 second (1,000 milliseconds). The assertion of AND gate 510 triggers a 50 ms delay implemented by counter 512. Similarly, 32QR and 50F2 elements are inputs to AND gate 514. The assertion of AND gate 514 triggers a 50-millisecond delay implemented by counter 516. The acceleration output generated by OR gate 518 may increase the speed of operation by various amounts. For example, the acceleration output may decrease the delay time by a factor of 2 or more. In another example, the typical delay associated with the 50SP element is 1 second; however, when the 50SP element and the inverse of the 32QR element are detected, the delay may be reduced to 50 milliseconds (i.e., a reduction by a factor of 20). In another example, if a 51SP element was accelerated, then the time dial setting of curve could be reduced by a factor which would proportionately reduce the operating time of the element. Reducing the duration of a fault condition by tripping earlier and subsequently de-energizing the generator may reduce the potential for damage to a generator caused by the fault.

Figure 6A:
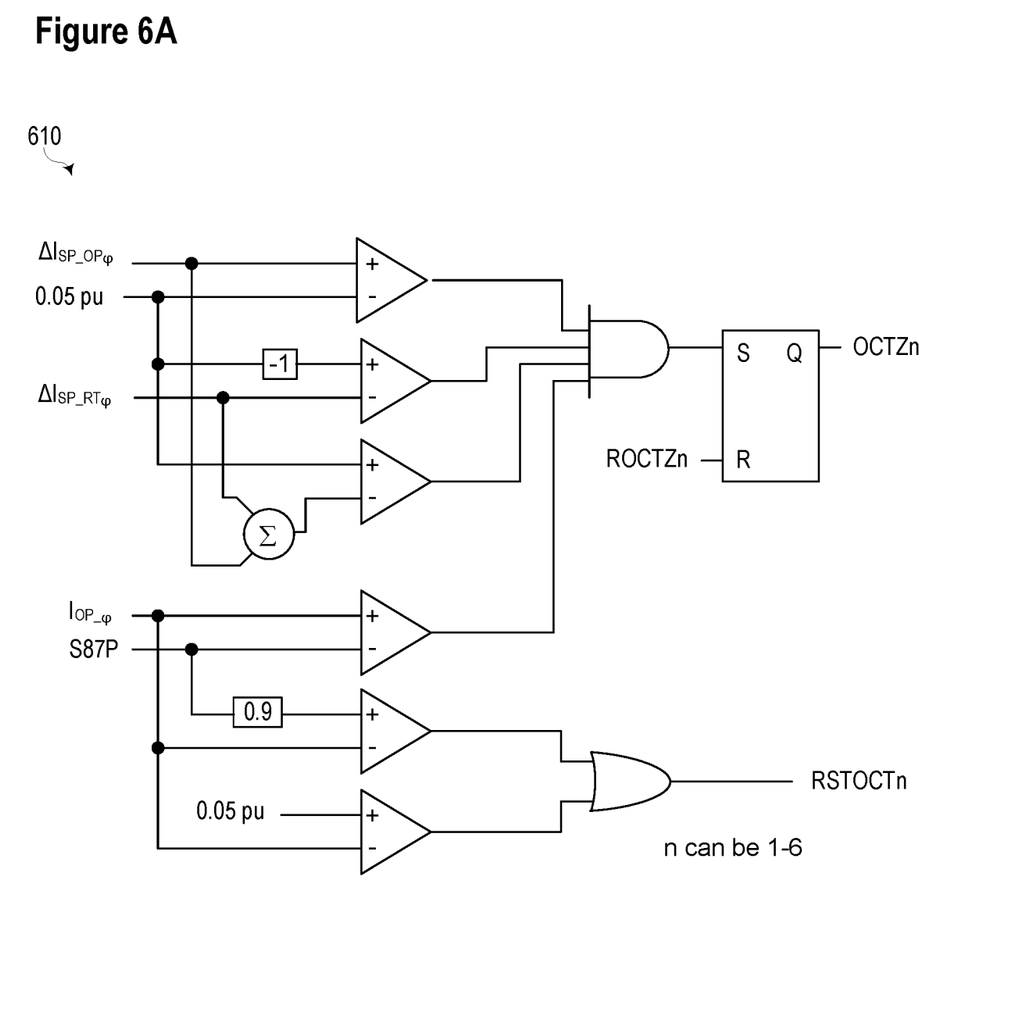
FIG. 6A illustrates a logic diagram of an open current transformer detection system consistent with embodiments of the present disclosure.

FIG. 6A illustrates a logic diagram of an open current transformer detection system 600 consistent with embodiments of the present disclosure. A CT open or short circuit may initiate a generator trip in systems with multiple branch CTs available for split-phase protection. To secure an 87SP function, system 600 may be used to restrain the 87SP function from operating and instead generate an alarm.

Logic 610 may use the values of $\Delta I_{SP\_OP\_\phi}$ and $\Delta I_{SP\_RT\_\phi}$, along with a value of an 87SP protection element. Logic 610 may generate an output OCTZn to represent a CT failure, such as an open CT or a shorted CT. An output RSTOCTn may represent resetting of the CT failure condition.

Figure 6B:
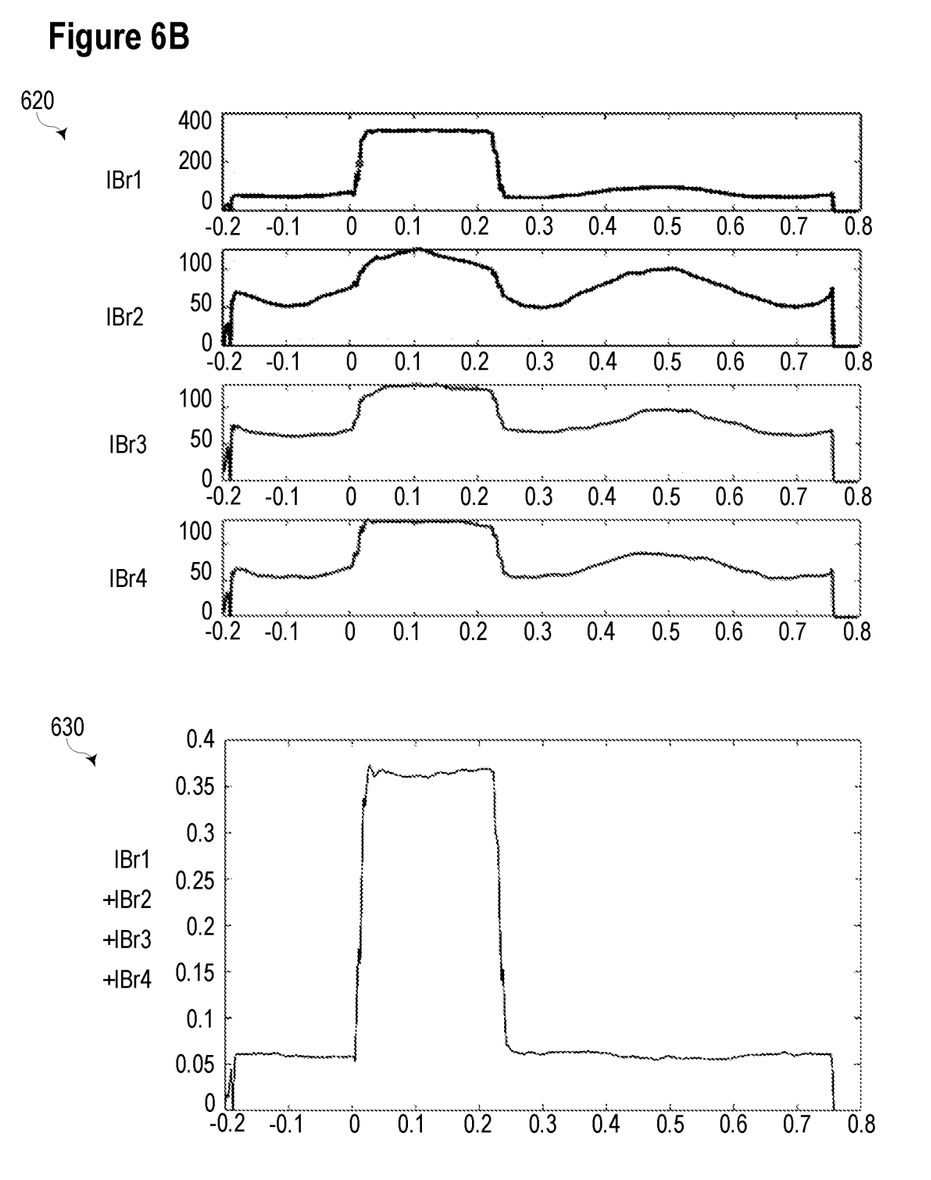
FIG. 6B illustrates a plurality of plots over time of branch currents within a split-phase protection system consistent with embodiments of the present disclosure.

FIG. 6B illustrates a plurality of plots over time of branch currents within a split-phase protection system consistent with embodiments of the present disclosure. The split-phase protection system includes four branches, as shown by IBr1, IBr2, IBr3, and IBr4 in plot 620. The current through the faulted branch, IBr1, increases the most because of a turn-to-turn fault. The current through the other branches also increases, although to a reduced extent.

Plot 630 illustrates a sum of the currents through each branch. The sum of the individual branch currents shows a substantial increase in the operating current as a result of the turn-to-turn fault. Based on the increase, a protection system monitoring the branch currents may implement a protective action.

Figure 7:
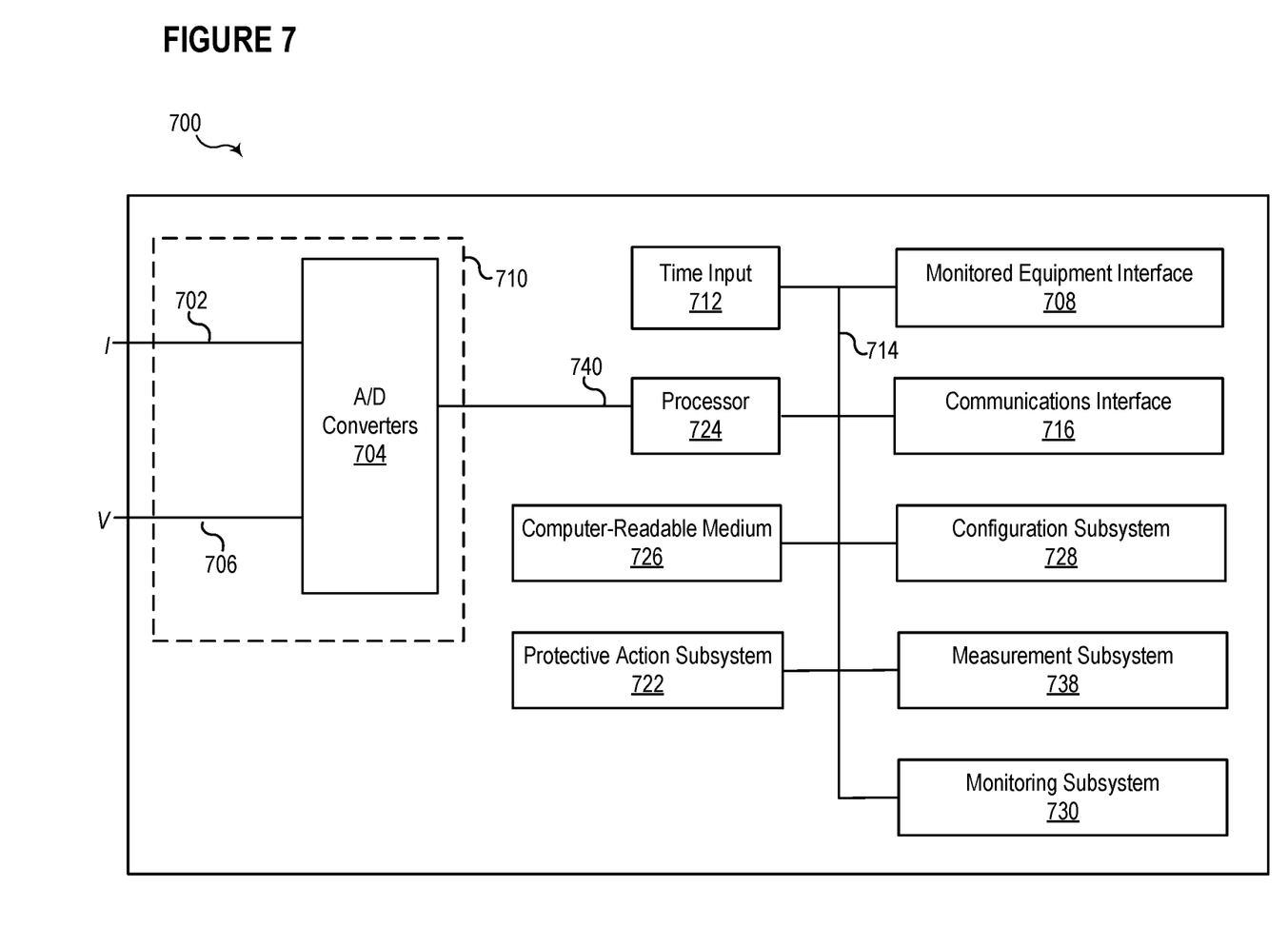
FIG. 7 illustrates a functional block diagram of a system to provide split-phase protection to one or more synchronous generators consistent with embodiments of the present disclosure.

FIG. 7 illustrates a functional block diagram of a system 700 to provide split-phase protection to one or more synchronous generators consistent with embodiments of the present disclosure. System 700 may be implemented using hardware, software, firmware, and/or any combination thereof. In some embodiments, system 700 may be embodied as an IED, a protective relay, or other type of device. Certain components or functions described herein may be associated with other devices or performed by other devices. The specifically illustrated configuration is merely representative of one embodiment consistent with the present disclosure.

System 700 includes a communications interface 716 to communicate with relays, IEDs, and/or other devices. In certain embodiments, the communications interface 716 may facilitate direct communication or communicate with systems over a communications network (not shown). System 700 may further include a time input 712, which may be used to receive a time signal (e.g., a common time reference) allowing system 700 to apply a time-stamp to acquired samples. In certain embodiments, a common time reference may be received via communications interface 716, and accordingly, a separate time input may not be required for time-stamping and/or synchronization operations. One such embodiment may employ the IEEE 1588 protocol. A monitored equipment interface 708 may receive status information from, and issue control instructions or protective actions to, a piece of monitored equipment (e.g., a circuit breaker, conductor, transformer, or the like).

Processor 724 processes communications received via communications interface 716, time input 712, and/or monitored equipment interface 708. Processor 724 may operate using any number of processing rates and architectures. Processor 724 may perform various algorithms and calculations described herein. Processor 724 may be embodied as a general-purpose integrated circuit, an application-specific integrated circuit, a field-programmable gate array, and/or any other suitable programmable logic device. A data bus 714 may provide connection between various components of system 700.

Instructions to be executed by processor 724 may be stored in computer-readable medium 726. Computer-readable medium 726 may comprise random access memory (RAM) and non-transitory storage. Computer-readable medium 726 may be the repository of software modules configured to implement the functionality described herein.

System 700 may include a sensor component 710. In the illustrated embodiment, sensor component 710 may receive current measurements 702 and/or voltage measurements 706. The sensor component 710 may comprise ND converters 704 that sample and/or digitize filtered waveforms to form corresponding digitized current and voltage signals. Current measurements 702 and/or voltage measurements 706 may include separate signals from each phase of a three-phase electric power system. ND converters 704 may be connected to processor 724 by way of data bus 740, through which digitized representations of current and voltage signals may be transmitted.

A configuration subsystem 728 may allow an operator to configure various aspects of system 700, including criteria related to a thresholds or parameters associated with the synchronous generators protected by system 700. In some embodiments, an operator may provide information about the rated capacity of a generator and suggested values for various parameters may be suggested.

A protective action subsystem 722 may implement a protective action based on various conditions monitored by system 700. In various embodiments, a protective action may include tripping a breaker, selectively isolating or disconnecting a generator or other portion of the electric power system, etc.

A measurement subsystem 738 may be configured to receive a plurality of raw measurements of a parameter in the electric power system. In some embodiments, measurement subsystem 738 may receive the plurality of raw measurements from sensor component 710. In other embodiments, the plurality of raw measurements may be provided to system 700 by another device.

A monitoring subsystem 730 may be configured to monitor a split-phase system associated with one or more synchronous generators. Monitoring subsystem 730 may implement any of the protection schemes described herein. Such schemes may include external fault detector (e.g., system 200 illustrated in FIG. 2A and system 240 illustrated in FIG. 2B), an open current transformer detector (e.g., system 600 illustrated in FIG. 6A), a 50SP protection element, a 51SP protection element, a 32QF protection element, a 50F2 protection element, etc.

Figure 8:
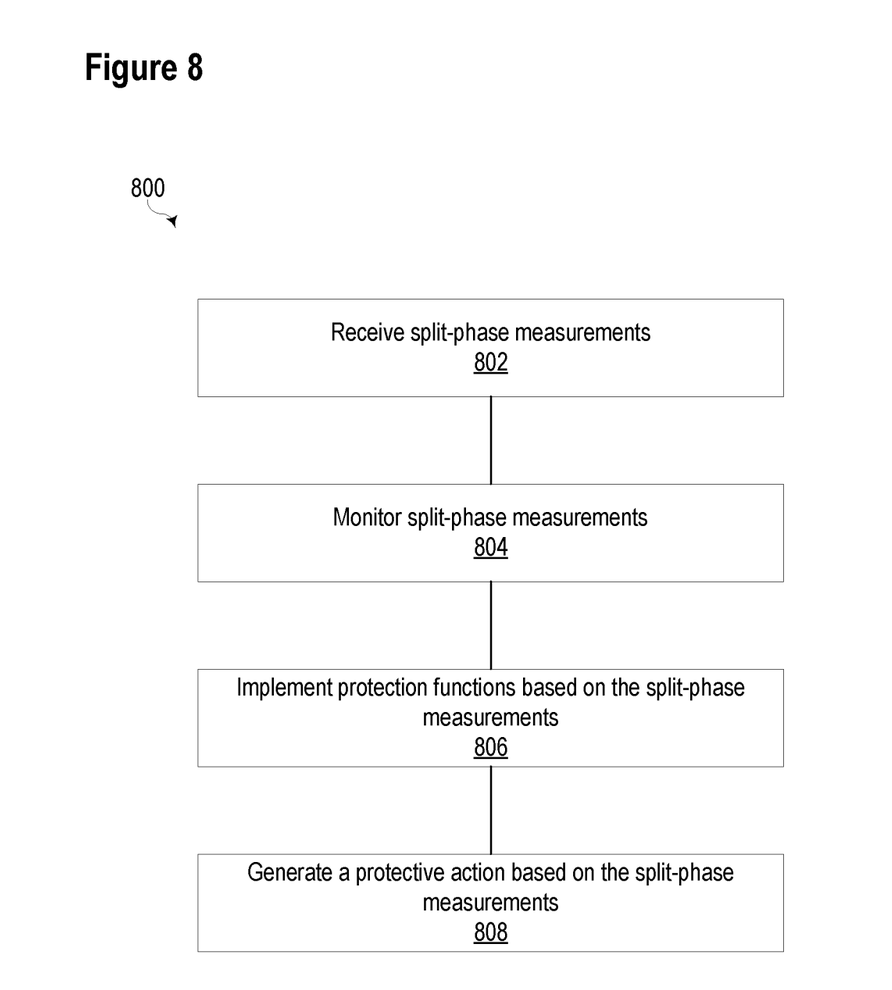
FIG. 8 illustrates a flow chart of a method of providing split-phase protection to one or more synchronous generators consistent with embodiments of the present disclosure.

FIG. 8 illustrates a flow chart of a method 800 of providing split-phase protection to one or more synchronous generators consistent with embodiments of the present disclosure. At 802, a system implementing method 800 may receive split-phase measurements. The split-phase measurements may be received from current transformers configured to monitor branch currents within a synchronous generator system. For example, a plurality of measurements may correspond to current measurements detected by current transformers 124, 126, 128, and 130 in system 120 and illustrated in FIG. 1B.

At 804, a system implementing method 800 may monitor the plurality of split-phase measurements. Various types of monitoring may be performed. For example, monitoring subsystem 730 in system 700 of FIG. 7 may monitor a stream of measurements.

At 806, protection functions may be implemented based on the split-phase measurements. In various embodiments consistent with the present disclosure, ANSI 32QR, 50SP, 51SP, 50F2, and/or 87SP elements may be used. The elements may be used in combination or individually. Combinations of protective actions may trigger an acceleration output and be used to implement a protective action more quickly.

At 808, a protective action may be generated. A first protective action may be implemented after a first time delay, and a second protective action after a second time delay. A protective element may be accelerated based on a combination of protective elements. For example, system 520 of FIG. 5C illustrates a system that may accelerate a protective action based on a 32QR, 50SP, and/or a 50F2 element.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system configured to monitor at least one generator, the system comprising:
    a measurement subsystem to receive a plurality of split-phase measurements of branch currents associated with the at least one generator;
    a split-phase transverse differential monitoring subsystem to:
        receive the plurality of split-phase measurements of branch currents associated with the at least one generator;
        generate a complex exponential function based on the plurality of split-phase measurements of the branch currents to shift a phase of each of the branch currents by multiplying the branch currents with the complex exponential function;
        calculate a phasor operating current based on the phase-shifted branch currents; and
        generate an offset value representing a standing split-phase current based on the phasor operating current; and
    a protective action subsystem to generate a first protective action based on the phasor operating current and the offset value.

2. The system of claim 1, wherein the at least one generator comprises a synchronous generator.

3. The system of claim 1, wherein the split-phase transverse differential monitoring subsystem is configured to detect an inter-turn fault in the at least one generator.

4. The system of claim 1, further comprising an external fault detector, and
wherein the external fault detector is configured to restrain the protective action subsystem.

5. The system of claim 1, wherein the split-phase transverse differential monitoring subsystem is further configured to detect a current transformer failure condition and to restrain the protective action subsystem.

6. The system of claim 1, wherein the split-phase transverse differential monitoring subsystem further comprises:
a first counter to operate after a first delay and based on a first protective element and a second protective element;
a second counter to operate after a second delay and based on the first protective element and a third protective element; and
an acceleration output based on operation of at least one of the first counter and the second counter.

7. The system of claim 6, wherein the first protective element comprises a split-phase overcurrent protection element and the second protective element comprises forward reactive power protection element.

8. The system of claim 6, wherein the first protective element comprises a forward reactive power element and the second protective element comprises a field second harmonic overcurrent protection element.

9. The system of claim 6, wherein the acceleration output decreases a third subsequent time delay by at least a factor of 2.

10. A method of monitoring at least one generator, the method comprising:
receiving, using a measurement subsystem, a plurality of split-phase measurements of branch currents associated with the at least one generator;
providing a split-phase transverse differential monitoring subsystem to:
receive the plurality of split-phase measurements of branch currents associated with the at least one generator;
generate a complex exponential function based on the plurality of split-phase measurements of the branch currents to shift a phase of each of the branch currents by multiplying the branch currents with the complex exponential function;
calculate a phasor operating current based on the phase-shifted branch currents;
generate an offset value representing a standing split phase current based on the phasor operating current; and
generating, using a protective action subsystem a first protective action based on the phasor operating current and the offset value.

11. The method of claim 10, wherein the at least one generator comprises a synchronous generator.

12. The method of claim 10, wherein the split-phase transverse differential monitoring subsystem is configured to detect an inter-turn fault in the at least one generator.

13. The method of claim 10, further comprising:
detecting, using an external fault detector, an external fault; and
restraining the protective action subsystem based on the external fault.

14. The method of claim 10, further comprising:
detecting, using the split-phase transverse differential monitoring subsystem, a current transformer failure condition; and
restraining the protective action subsystem.

15. The method of claim 10, further comprising:
providing a first counter to operate after a first delay and based on a first protective element and a second protective element;
a second counter to operate after a second delay and based on the first protective element and a third protective element; and
an acceleration output based on operation of at least one of the first counter and the second counter.

16. The method of claim 15, wherein the first protective element comprises a split-phase overcurrent protection element and the second protective element comprises forward reactive power protection element.

17. The method of claim 15, wherein the first protective element comprises a forward reactive power element and the second protective element comprises a field second harmonic overcurrent protection element.

18. The method of claim 15, wherein the acceleration output decreases a subsequent time delay by at least a factor of 2.

* * * * *